United States Patent
Palanisamy

(10) Patent No.: US 11,221,102 B2
(45) Date of Patent: Jan. 11, 2022

(54) COLUMN MOUNTING BRACKET

(71) Applicant: Sunderamohan Palanisamy, Toronto (CA)

(72) Inventor: Sunderamohan Palanisamy, Toronto (CA)

( * ) Notice: Subject to any disclaimer, the term of this patent is extended or adjusted under 35 U.S.C. 154(b) by 0 days.

(21) Appl. No.: 16/004,368

(22) Filed: Jun. 9, 2018

(65) Prior Publication Data
US 2020/0370707 A1 Nov. 26, 2020

(51) Int. Cl.
*F16M 13/02* (2006.01)
*F16B 2/08* (2006.01)

(52) U.S. Cl.
CPC ............. *F16M 13/022* (2013.01); *F16B 2/08* (2013.01)

(58) Field of Classification Search
CPC ........ F16M 13/022; F16M 13/02; F16B 2/08; A01M 31/02
USPC .............................................. 248/218.4–219.4
See application file for complete search history.

(56) References Cited

U.S. PATENT DOCUMENTS

| | | | | |
|---|---|---|---|---|
| 4,147,160 A * | 4/1979 | Aranow | ............... | A61B 5/0011 340/573.3 |
| 4,325,529 A * | 4/1982 | Seebinger | .................. | F16B 2/08 248/218.4 |
| 4,601,067 A * | 7/1986 | Buonassissi | ....... | A41D 13/0055 2/102 |
| 5,106,385 A * | 4/1992 | Allen | ..................... | A61F 13/493 604/385.21 |
| 5,292,014 A * | 3/1994 | Lelong | ................... | A47G 7/045 211/107 |
| 5,799,918 A * | 9/1998 | Swinderman | .......... | B65D 88/66 248/219.1 |
| 5,857,651 A * | 1/1999 | Kunevicius | ............... | F41B 5/14 248/230.8 |
| 5,974,701 A * | 11/1999 | Busch | ..................... | A43B 11/00 223/111 |
| 6,065,722 A * | 5/2000 | LeVasseur | ............. | F21V 21/08 248/218.4 |
| 6,338,212 B1 * | 1/2002 | Santa Cruz | ............... | G09F 7/22 40/606.18 |
| 6,431,315 B1 * | 8/2002 | Lewis | ..................... | A63B 27/00 182/136 |
| 6,508,446 B1 * | 1/2003 | Addison | .............. | A47D 13/105 182/187 |
| 6,581,891 B1 * | 6/2003 | Byrd | ...................... | A01K 31/14 248/218.4 |
| 7,108,235 B2 | 9/2006 | Kanashiki | | |
| 8,302,922 B1 * | 11/2012 | Robinson | ............... | A47G 25/08 248/219.4 |
| 9,378,666 B1 * | 6/2016 | Woodruff | ................ | G09F 17/00 |
| 9,664,334 B2 | 5/2017 | Baker et al. | | |
| 2011/0083399 A1 * | 4/2011 | Lettkeman | .............. | E04H 12/24 52/745.21 |

* cited by examiner

Primary Examiner — Christopher Garft

(57) ABSTRACT

A column mounting bracket, suitable for mounting an object to a column and other structures without the need of drilling. The mounting systems includes a column mounting bracket, at least one webbing strap and a tightening mechanism. The column mounting bracket configured to be selectively coupled to a specific object or assembly that needs to be mounted. The webbing straps are outfitted with fastening mechanism. The invention can be un-tied or move from one place to another without a serious effort as needed in the conventional mounting systems.

8 Claims, 5 Drawing Sheets

COLUMN MOUNTING BRACKET

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates generally to a mounting system. More specifically, the invention relates to mounting systems for mounting objects to structures such as columns and pillars. The mounting systems includes a mounting bracket, at least one webbing and a fastening mechanism. The column mounting bracket is coupled to a specific object that needs to be mounted. The webbing strap is outfitted with the fastening mechanism to tighten the mounting bracket to the column. Further, the fastening mechanism is employed to take up the slack and tension the assembly to the necessary level.

DESCRIPTION OF THE RELATED ART

Columns and pillars, widely part of an architecture is typically a structural element and should not be tampered with. The ability to mount objects onto a column, such as a television, speakers, art, light fixtures can be very challenging especially when the mounted object is heavy or large. Furthermore, columns come in so many different sizes and shapes, requiring customized size column mounts to cater for each of them. Currently, specialized custom fitting brackets and/or bands are needed to fit specific column diameters and shape. The mounting brackets and bands for large columns are large and heavy to transport and maneuver into elevators and doors. The available mounting brackets come in multiple parts that need to be assembled and require specialized tools to install. The complexity of size, multiple parts and multiple tools leads to a complex assembly process requiring more time and labor. Moreover, mounting the brackets and object, requires one person to hold the object in place and another person to attach the object with a bracket. The process becomes very difficult when the object is heavier.

Existing inventions used metal straps and fabricated metal clamps which are heavy, inflexible and not easy to maneuver, tightening a metal strap and metal clamp without specialize tools makes the installation complicated and the product expensive.

Further, the conventional mounting devices are either permanently fixed at any place or they are mounted with so many fixing tools like screws or bolts that it is very cumbersome to remove them from one place and install it at any different location.

In the Patent No. WO2008010736A1 Wlodzimierz Smieszek et. al discloses a ready and typical carrying elements, designed for mounting objects onto walls and meant for mounting flat displaying screens. The object mounting wall, designed especially for mounting flat television or computer screens, consists of plates mounted on at least one side to carrying pillars placed between the floor and the ceiling. It is characterized in that it has a screen mounting element in the form of a column supporting at least against the floor, or against the room floor and the ceiling. A column consists of at least one vertical bar with any diameter and has a mounting element connected to at least one part of the column. Television or computer screen is mounted directly or indirectly to the mounting element.

Further, in the U.S. Pat. No. 8,418,861 B1 William Weaver et. Al discloses a Television wall-mount with integrated shelving The television wall-mount with integrated shelving is an accessory that either mounts to a rear surface of a television or a wall-mount television to a television. The shelving accessory descends from below said television to provide at least one shelf for showcasing items used in playing audio-video upon said television. The shelving accessory is capable of lateral as well as vertical adjustment with respect to the television. The shelving accessory can also rotate about a vertical axis and in concert with the television and wall-mount in order to provide greater viewing angle of said television.

Furthermore, in the U.S. Pat. No. 8,724,037 B1 Kurt William Massey discloses a mounting system capable of mounting objects to support structures. The mounting system includes a wall mount including a display bracket configured to hold the object, a fixed support bracket coupled to a vertical support structure, and a linkage assembly. The linkage assembly has a low-profile stowed configuration in which the object is held in a raised position close to the support structure. The linkage assembly moves to another configuration to move the object. The object can be held in a lowered position. A biasing mechanism can facilitate convenient movement of the object.

For the reasons stated above and for other reasons stated below which will become apparent to those skilled in the art upon reading and understanding the present specification, there is a need in the art for an effective and easy to install column mounting bracket that can be used on columns of different diameters, sizes and shapes.

However, to applicant's knowledge, none of these prior art methods have been found to be completely suitable to meet these needs. The existing methods are very limited to certain applications, heavy to transport and complicated to put together. Thus, there is a need in the prior art to have a mechanism to attach any object to a column/pillar with limited number of hardware and can be used in various applications. There is a need for a mounting system which enables anyone to be able to mount something on a column easily. The present invention provides such a method and the overall combination of these features is nowhere disclosed in the prior art cited above which appears to be representative of the general art in this area although it is not intended to be an all-inclusive listing of pertinent prior art patents.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract.

The invention solves a question of providing ready and typical carrying elements, designed for mounting objects onto architecture columns. The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

According to one embodiment of the present disclosure, an adjustable mounting device can be attached to an architecture column of any size and shape without compromising the structural integrity of the column. The adjustable mounting device comprises a mounting bracket, at least one webbing strap, and a collapsible mounting assembly having a holding portion that is designed to allow objects to be mounted directly on it.

According to an alternate embodiment of the present disclosure, the mounting surface could be a pillar, a pole or any other structure having different sizes and shapes.

According to an alternate embodiment of the present disclosure, the holding portion could be the mounting bracket itself.

According to one embodiment of the present disclosure, the mounting bracket is made of a hard material e.g. steel, iron or any other suitable material.

According to one embodiment of the present disclosure the mounting bracket is having outer surface and an inner surface, a first side edge, a second side edge, an upper end and a lower end. Further, the outer surface of the mounting bracket has upper end slots towards the upper side of the mounting bracket and lower end slots towards the lower end of the mounting bracket.

According to an alternate embodiment of the present disclosure, the mounting bracket could have other desirable shapes as per requirement.

According to one embodiment of the present disclosure the mounting bracket as shown in further comprises of an upper bolt mounted toward the upper end and a lower bolt mounted towards the lower end. The upper end slots and the lower end slots are symmetrically distributed about the upper bolt and lower bolt respectively. More precisely, the three upper end slots are situated in the right side of the upper bolt towards first side edge and rest three upper end slots are situated in the left side of the upper bolt towards second side edge. Similarly, the three lower end slots are situated in the right side of the lower bolt towards the first side edge and the rest three slots are situated in the left side of the lower bolt towards the second side edge. Further, butterfly nuts are screwed upon the upper bolt and lower bolt in order to receive the collapsible mounting assembly.

According to an alternate embodiment of the present disclosure, the mounting bracket have at least two bolts that can be mounted at any place on the mounting bracket as per the requirement to fix the collapsible mounting assembly.

Further, according to an alternate embodiment of the present disclosure, the mounting bracket could have other mounting fixtures than bolts and butterfly nuts to mount the collapsible mounting assembly.

According to an alternate embodiment of the present disclosure, the mounting bracket could have at least two slots situated at any suitable location on the mounting bracket surface. The number of rows of slots on the mounting bracket used to thread the webbing straps through may vary according to the weight and physical characteristics of the mounted object.

According to one embodiment of the present disclosure a first webbing strap is passes through the upper end slots of the mounting bracket and a second webbing strap is passes through the lower end slots.

According to one embodiment of the present disclosure the slot size is made proportioned to the width of the webbing strap used. The material of the webbing used is typically polyester which is UV resistant.

Further, according to an alternate embodiment of the present disclosure, the mounting bracket could have at least one webbing strap passes through at least two slots of the mounting bracket. Furthermore, the webbing straps could be made of any other suitable flexible material e.g. nylon, cotton etc.

According to one embodiment of the present disclosure, the mounting bracket is tightened upon a column with the help of two webbing straps passing through the upper and lower mounting slots on the mounting bracket.

According to one embodiment of the present disclosure, the webbing straps are tightened upon the column with the help of fastening mechanism. A first ratchet is connected to the first webbing strap and second ratchet is connected to the second webbing strap.

According to one embodiment of the present disclosure, the mounting bracket is secured to the column using the webbing straps attached to a ratchet buckles making it like a ratchet strap. The two webbing straps are threaded through the slots on the mounting plate, then wrapped around the column lastly through the center rotating spool of the ratchet buckle. Once the webbing straps are threaded through the ratchet buckle, the ratcheting mechanism is employed to take up the slack and tension the assembly to the necessary level or to tightening the webbing strap to a certain level so that the mounting bracket can be fixedly mounted.

According to an alternate embodiment of the present disclosure, the webbing straps could be tightened upon pillar, column or any other suitable mounting structure with the help of other fastening mechanisms than ratcheting mechanism e.g. Velcro, snap fit etc.

According to one embodiment of the present disclosure, the collapsible mounting assembly is connected to the mounting bracket. The collapsible mounting assembly is rotatable with respect to the mounting bracket. Further, the collapsible mounting assembly has a rotatable arm situated between two other arms. The one end of the rotatable arm rotating upon a latch and has a holding portion at free end. The holding portion of the rotatable arm is holding the object. The object is a flat screen TV. The flat screen TV is having a mounting portion at back side that is received into the holding portion of the rotatable arm.

According to an alternate embodiment of the present disclosure, the object to be mounted upon the mounting bracket or the collapsible mounting assembly could be able to move in any direction.

According to an alternate embodiment of the present disclosure, the holding portion is employed with various tools in order to allow the movement of the mounted object in any desired direction e.g. latches, pulley, guiding paths, guiding rails, ball joint or any other suitable movement mechanism.

According to an alternate embodiment of the present disclosure the object mounted on the mounting bracket or collapsible mounting assembly could be a television, furniture, safety equipment, electronics equipment, or any other mechanical or electrical device.

This Summary is provided merely for purposes of summarizing some example embodiments, to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION OF DRAWINGS

Figure 7:
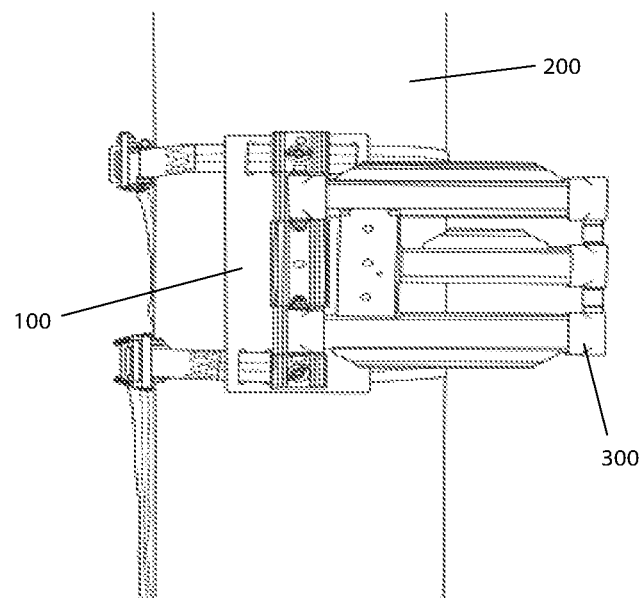

FIG. 7 a collapsible mounting assembly mounted on the mounting bracket in a first position according to one embodiment of the present invention.

Figure 8:
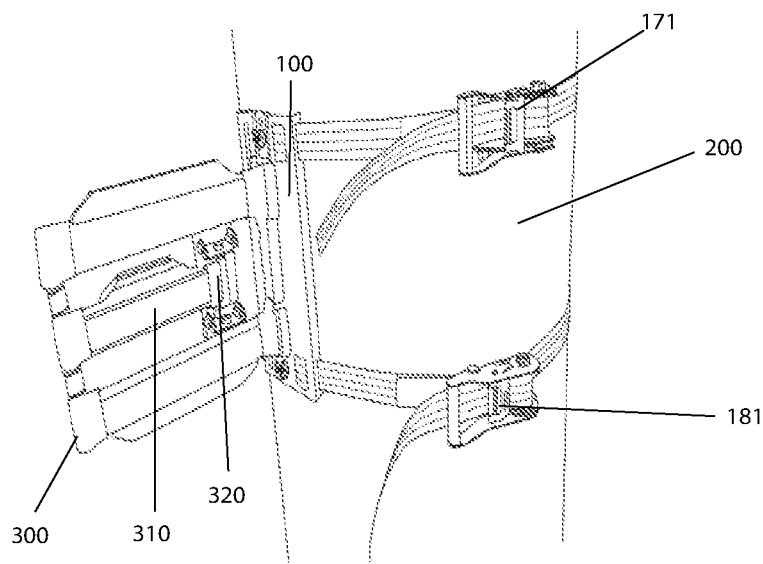

FIG. 8 Shows the collapsible mounting assembly mounted on the mounting bracket in a second position according to one embodiment of the present invention.

Figure 9:
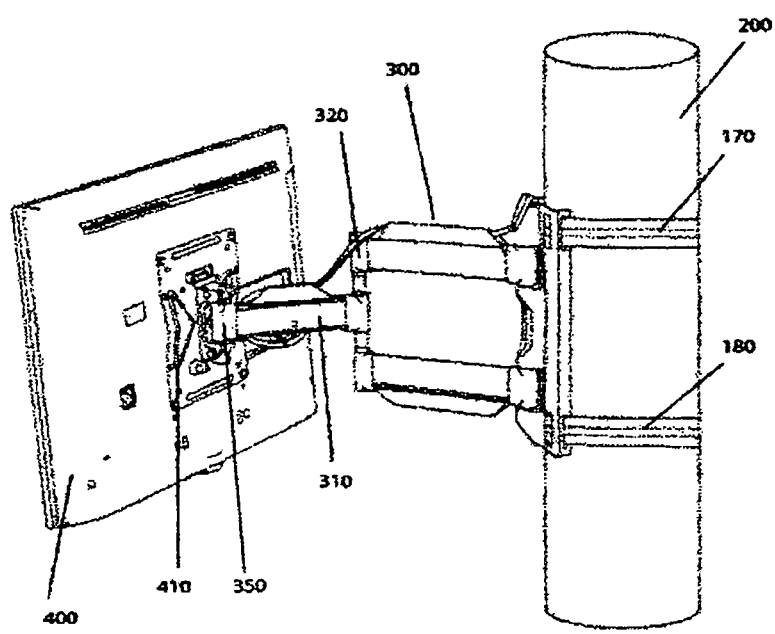

FIG. 9 Shows an object mounted on the collapsible mounting assembly according to one embodiment of the present disclosure.

DETAIL DESCRIPTION

Embodiments of the present disclosure will be described more fully hereinafter with reference to the accompanying drawings in which like numerals represent like elements throughout the figures, and in which example embodiments are shown. Embodiments of the claims may, however, be embodied in many different forms and should not be construed as limited to the embodiments set forth herein. Before explaining the invention in detail, it is to be understood that the invention is not limited in its application to the detail of application illustrated in the drawings since the invention is capable of other embodiments and of being practiced or carried out in various ways. It is also to be understood that the phraseology or terminology employed is for description only and not of limitation.

According to one embodiment of the present disclosure, an adjustable mounting device mounted upon a column with the help of a fastening mechanism is provided for mounting an object.

Figure 1:
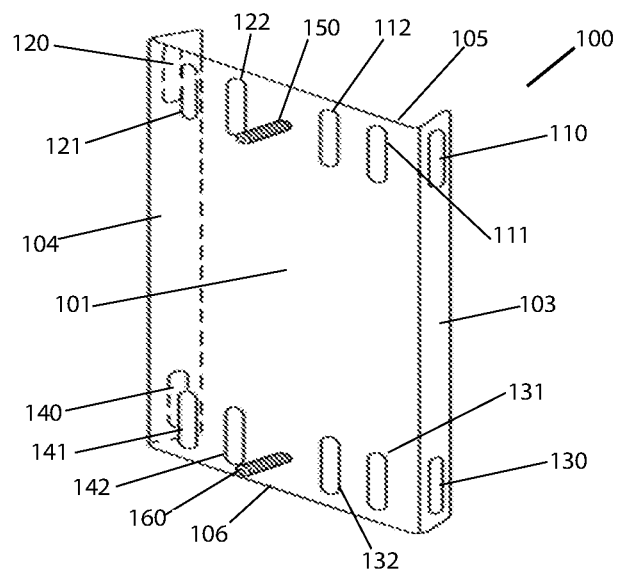
FIG. 1 Shows a perspective view of the mounting bracket according to one embodiment of the present disclosure.

According to one embodiment of the present disclosure a mounting bracket 100 is made of a hard material as shown in FIG. 1 comprises of an outer surface 101 and an inner surface 102, a first side edge 103, a second side edge 104, an upper end 105 and a lower end 106. Further, the outer surface 101 of the mounting bracket 100 has upper end slots (110, 111, 112, 120, 121, 122) towards the upper end 105 of the mounting bracket 100 and lower end slots (130, 131, 132, 140, 141, 142) towards the lower end 106 of the mounting bracket 100.

According to one embodiment of the present disclosure the mounting bracket 100 as shown in FIG. 1 further comprises of an upper bolt 150 mounted toward the upper end 105 and a lower bolt 160 mounted towards the lower end 106. The upper end slots (110, 111, 112, 120, 121, 122) and the lower end slots (130, 131, 132, 140, 141, 142) are symmetrically distributed about the upper bolt 150 and lower bolt 160 respectively. More precisely, the three upper end slots (110, 111, 112) are situated in the right side of the upper bolt 150, towards first side edge 103 and rest three upper end slots (120, 121, 122) are situated in the left side of the upper bolt 150, towards second side edge 104. Similarly, the three lower end slots (130, 131, 132) are situated in the right side of the lower bolt 160, towards the first side edge 103 and the rest three slots (140, 141, 142) are situated in the left side of the lower bolt 160 towards, the second side edge 104.

Figure 2:
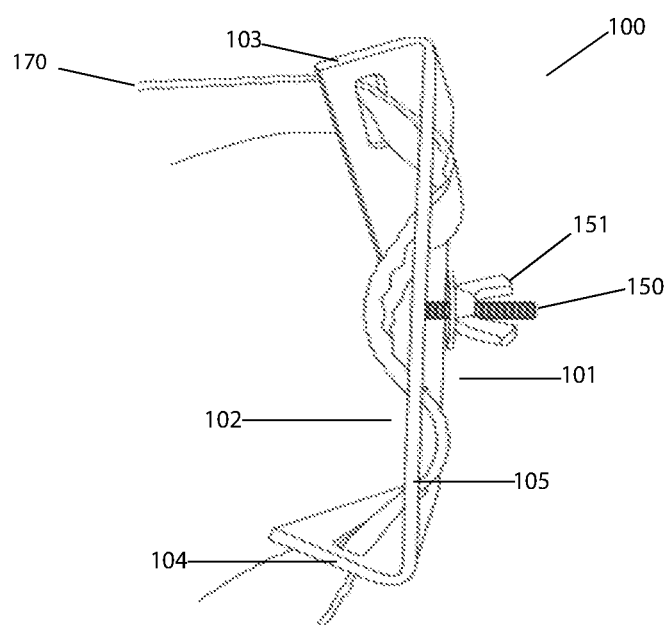
FIG. 2 Shows a top view of the mounting bracket with a webbing strap passes through it according to one embodiment of the present disclosure.
Figure 3:
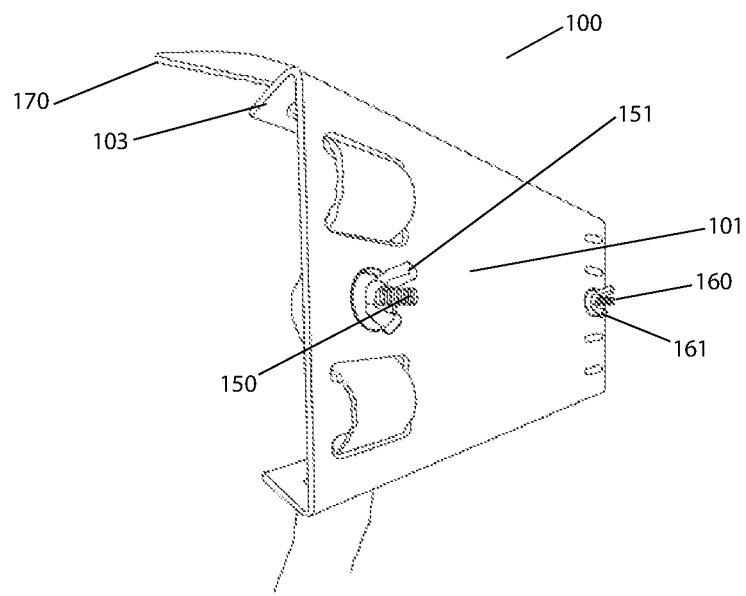
FIG. 3 Shows a perspective view of the outer surface of the mounting bracket according to one embodiment of the present disclosure.

As shown in the FIG. 2 a first webbing strap 170 is passes through the upper end slots (110, 111, 112, 120, 121, 122) of the mounting bracket 100. Further, a butterfly nut 151 is also screwed upon the upper bolt 150 according to one embodiment of the present disclosure FIG. 3 shows the outer surface 101 of the mounting bracket in which the first webbing strap 170 is passing through the upper end slots (110, 111, 112, 120, 121, 122) and a butterfly nut 161 is screwed upon the lower bolt 160. Further, another butterfly nut 151 which is screwed upon the bolt 150 is also shown in the FIG. 3 according to one embodiment of the present disclosure the mounting bracket 100

Figure 4:
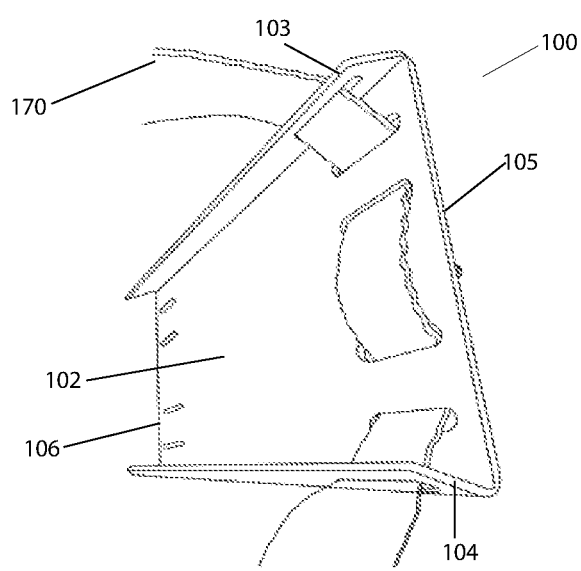
FIG. 4 Show a perspective view of the inner surface of the mounting bracket according to one embodiment of the present disclosure.

According to one embodiment of the present disclosure the inner surface 102 of the mounting bracket 100 is shown in the FIG. 4. Further, the first webbing strap 170 is also shown passing through the upper end slots (110, 111, 112, 120, 121, 122).

Figure 5:
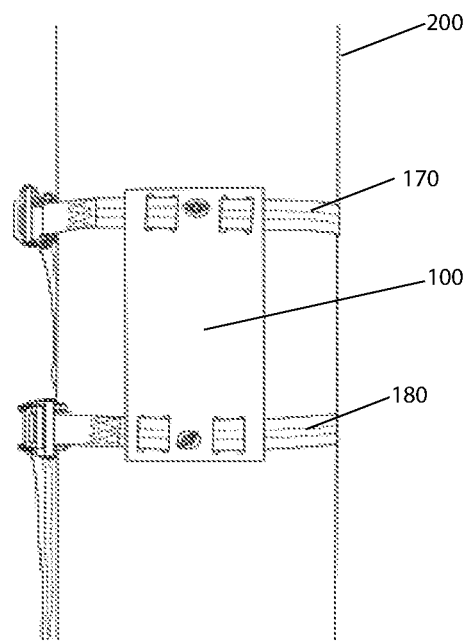
FIG. 5 Shows a front view of the mounting bracket mounted on a column according to one embodiment of the present disclosure.

FIG. 5 shows a mounting bracket 100 mounted upon a column 200. A second webbing strap 180 is also passing through the lower end slots (130, 131, 132, 140, 141, 142) according to the one embodiment of the present disclosure.

Figure 6:
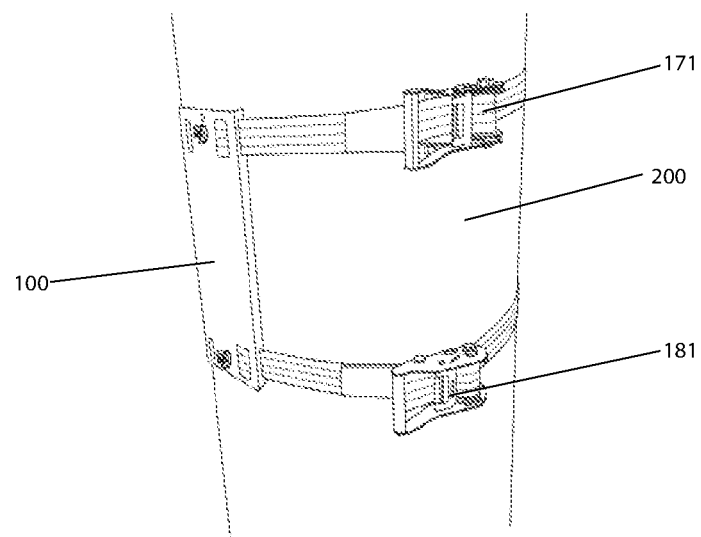
FIG. 6 Shows a side view of the mounting bracket mounted on a column with a fastening mechanism according to one embodiment of the present disclosure.

FIG. 6 shows a first ratchet 171 for tightening the first webbing strap 170 and a second ratchet 181 for tightening the second webbing strap 180 on the column 200 according to one embodiment of the present disclosure.

As shown in FIG. 7 and FIG. 8 a collapsible mounting assembly 300 is connected to the mounting bracket 100 that is mounted upon the column 200 according to one embodiment of the present disclosure. The collapsible mounting assembly 300 is rotatable with respect to the mounting bracket 100. The collapsible mounting assembly 300 has a rotatable arm 310 situated between other two arms 320 and 330. The one end of the rotatable arm 310 is rotating upon a latch 340 and has a holding portion 350 at free end.

The holding portion 350 of the rotatable arm 310 according to one embodiment of the present disclosure is receiving an object 400. The object is a flat screen TV. The flat screen TV 400 as shown in FIG. 9 is having a mounting portion 410 that is received upon the holding portion 350 of the rotatable arm 310.

According to an alternate embodiment of the present disclosure, the mounting bracket could have at least two slots situated at any suitable location on the mounting bracket. The number of rows of slots on the mounting bracket used to thread the webbing straps through may vary according to the weight and physical characteristics of the mounted object.

According to an alternate embodiment of the present disclosure, the webbing straps are either flat webbing strap or tubular webbing strap made from natural or unnatural ingredients. The preferred webbing strap material is polyester due to its benefits as follows: Acid resistance, provides firm grip, lightweight, Low cost, non-explosive, non-sparking, non-conductive, quick drying, resistant to many chemicals (mildew, moisture, oil and grease), resistant to UV degradation, shape retention (reduces the risk of stretching and shrinkage, Soft, Strong, shock absorbent and Versatile According to the advantageous embodiment of the present disclosure, the application to different pillar sizes the circumference and curvature of the pillar will not affect the usability of the product and it is reusable.

According to the advantageous embodiment of the present disclosure, the adjustable mounting device allows for any item to be hung on column without drilling into the column, the said column can be of any diameter.

The invention claimed is:

1. An adjustable mounting device configured to mount around a mounting surface in order to hold an object, said adjustable mounting device comprises of:
   a mounting bracket having at least six slots, wherein a first portion of a first edge of said mounting bracket is curved at a predetermined acute angle and a second portion of a second edge of said mounting bracket is curved at said predetermined acute angle;
   wherein said second edge is opposite to said first edge and said predetermined acute angle is measured with respect to an inner surface of a central portion of said mounting bracket;
   wherein said at least six slots each corresponds to a cavity of a plurality of cavities in said mounting bracket;
   wherein each of said first portion and said second portion includes at least one slot of said at least six slots;
   at least one webbing strap in order to mount said mounting bracket on said mounting surface;
   wherein said at least one webbing strap passes through said mounting bracket a plurality of times via said plurality of cavities, and wherein said at least one webbing strap is adapted to secure said mounting bracket on said mounting surface by tightening said at least one webbing strap around said mounting surface through a fastening mechanism such that said first edge creates a first point of contact with said mounting surface at a first terminal portion of said first edge and said second edge creates a second point of contact with said mounting surface at a second terminal portion of said second edge;
   a collapsible mounting assembly comprised of at least one rotatable arm with a holding portion to hold said object, wherein said at least one rotatable arm is rotatable about a longitudinal axis of said mounting bracket and wherein said collapsible mounting assembly is physically connected to an outer surface of said central portion of said mounting bracket; and
   wherein said object is one of a television, furniture, safety equipment, electronic equipment, or an electrical device.

2. The adjustable mounting device according to claim 1, wherein said mounting surface is one of a wall, a column, a pillar, a pole, or a tree.

3. The adjustable mounting device according to claim 1, wherein said mounting surface is curved.

4. The adjustable mounting device according to claim 1, wherein said mounting bracket is made of a metal.

5. The adjustable mounting device according to claim 1, wherein said collapsible mounting assembly allows movements of said object in a plurality of directions.

6. The adjustable mounting device according to claim 1, wherein said at least one webbing strap is made of at least one of natural fibers or synthetic fibers.

7. The adjustable mounting device according to claim 1, wherein said fastening mechanism is one of a hook and loop fastener or ratcheting.

8. The adjustable mounting device according to claim 7, wherein said fastening mechanism is employed to fasten slack or tension said at least one webbing strap to a necessary level.

* * * * *